3,623,410
CAMERA HAVING ELECTRIC SHUTTER, LIGHT MEASURING AND TIMING NETWORK, AND MEMORY NETWORK
Kunio Mita, Tokyo-to, Japan, assignor to Asahi Kogaku Kogyo Kabushiki Kaisha, Tokyo-to, Japan
Filed June 18, 1969, Ser. No. 834,314
Claims priority, application Japan, June 22, 1968, 43/43,038
Int. Cl. G01j 1/16
U.S. Cl. 95—10 C
8 Claims

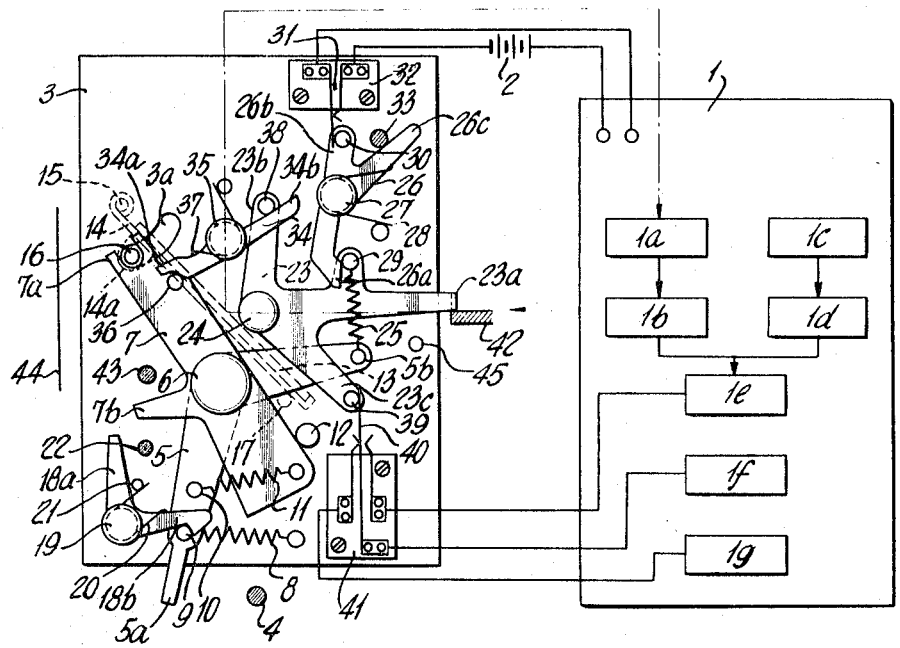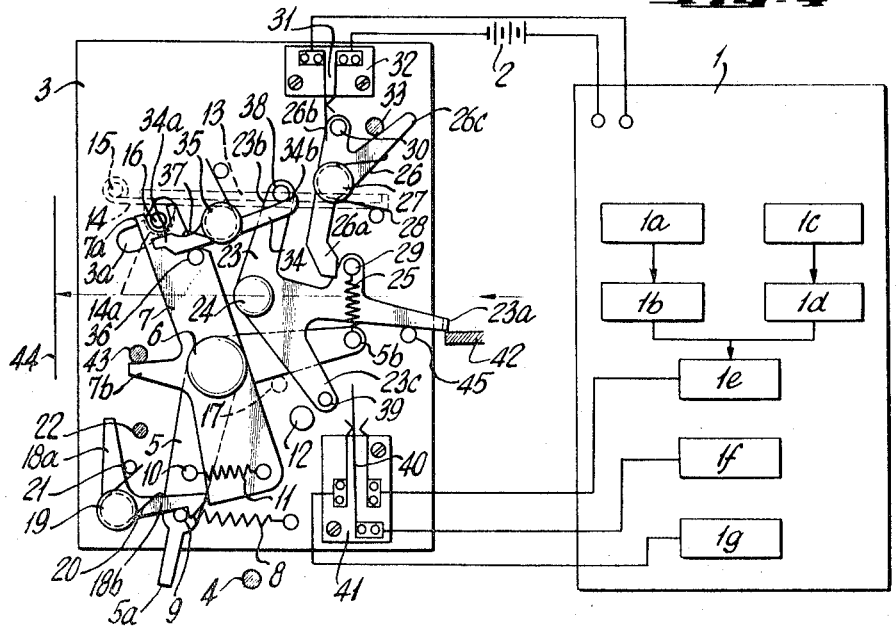

ABSTRACT OF THE DISCLOSURE

An automatic exposure timing system in a single lens reflex camera with a TTL light measuring system includes a memory device and a shutter timing network. A switch alternatively connects the memory device to the light measuring or timing network. A mirror return release mechanism consecutively actuates the switch to connect the memory device to the timing network and releases the mirror. The mirror retraction sequentially releases the automatic diaphragm and the shutter, and blocks the light measuring photocell. The closing operation of the shutter causes the spring return of the mirror and release mechanism and the actuation of the switch to connect the memory device to the light measuring network.

BACKGROUND OF THE INVENTION

The present invention relates generally to improvements in the automatic timing of a shutter in a single lens reflex or similar camera provided with a through the lens light measuring system and it relates particularly to a control mechanism for a light controlled shutter timing network with a through the lens light measuring system wherein an electric parameter corresponding to the measured light is stored in a memory device and is employed as a control for the shutter timing network.

The operation of the so-called external light receiving automatic electric shutter mechanisms, wherein a photocell receives the object light directly and not through the camera objective and the exposure time is determined in accordance with an electric parameter, for example the resistance value of a photoconductor when such photoconductor is employed as the photocell, since during shutter release operation the photocell is not withdrawn from the light path, nor the light path blocked, does not require the memorization of the resistance value of the element upon release operation. However with the automatic electric shutter of a TTL type camera, during shutter release operation the light responsive element is withdrawn from the light path or, in the case of a single lens reflex camera, the light path is blocked by a mirror or a shield, so that before the photographing operation it is necessary to temporarily memorize the resistance value of the photoconductor element by a memory circuit so as to determine the exposure time for shutter release in accordance with such memorized resistance value.

Various types of electric shutter circuits for such TTL type cameras have been proposed. In any of these electric shutter circuits it is necessary to establish an operation sequence where first the current source switch is closed, then, by means of the measuring circuit and the memory circuit, the resistance value of the light responsive element according to the object brightness is memorized, and further, a change-over of the memory circuit from the measuring circuit to the timing circuit must be completed before the withdrawal of the element out of the light path or the retraction of the mirror. The systems for effecting the sequence of operations heretofore proposed possess numerous drawbacks and disadvantages. They are awkward, complex and unreliable mechanisms leaving much to be desired.

SUMMARY OF THE INVENTION

It is a principal object of the present invention to provide an improved light controlled automatic shutter control mechanism.

Another object of the present invention is to provide an improved through the lens light controlled automatic shutter control mechanism.

Still another object of the present invention is to provide an improved control mechanism for an automatically time controlled shutter in a single lens reflex camera provided with a TTL light measuring system.

A further object of the present invention is to provide a mechanism of the above nature characterized by its reliability, simplicity, ruggedness, versatility and adaptability.

The above and other objects of the present invention will become apparent from a reading of the following description taken in conjunction with the accompanying drawings which illustrate preferred embodiments thereof.

In a sense the present invention contemplates the provision of a camera including an objective and a shutter actuatable between open and closed conditions, a light measuring network including a photocell exposable to light traversing said objective, a memory network, a shutter timing network responsive to said memory network for controlling the interval between the opening and closing of said shutter, switching means actuatable between alternative first and second conditions coupling said memory network respectively to said light measuring network or said shutter timing network and means for actuating said switch to be in said second condition during the open interval of said shutter and returning said switch to said second condition upon the closing of said shutter. In its preferred form the camera is a single lens reflex camera including a mirror swingable between an advanced position reflecting the objective traversing light to a view finder and toward a photocell or carrying the photocell and a retracted position blocking the photocell and permitting the image to be incident on the film plane. A pivoted actuating lever spring loaded with the cocking of the camera shutter urges the mirror to a retracted position. The release of the actuating lever causes the retraction of the mirror and effects the stopping down of the automatic objective preset diaphragm and the opening of the shutter. The memory device is normally connected through a double throw switch to the light measuring network. A sequencing mechanism releasably locks the actuating lever in its loaded position and actuates the switch during movement toward its release position to sequentially actuate the switch to connect the device to the timing network and then release the actuating lever. The closing of the shutter effects the return of the mirror, actuating lever, lock member and switch to their initial positions.

According to the present invention, the above mentioned operation of the switch arrangement is carried out through initial play action range of members for causing withdrawal of the light responsive element, the mirror swing-up movement on the diaphragm action, so that the operation sequence is assured and object brightness memorization is carried out immediately before photographing operation, thus assuring proper exposure time.

The improved network switching mechanism is simple, rugged and highly reliable and overcomes the drawbacks and disadvantages of the earlier arrangements.

BRIEF DESCRIPTION OF THE DRAWINGS

FIG. 3 is a view similar to FIG. 1 illustrating the initial operational step of the mechanism;

FIG. 4 is a view similar to FIG. 1 illustrating the mechanism upon release of the shutter and other operations attendant thereto;

DESCRIPTION OF THE PREFERRED EMBODIMENT

Figure 1:
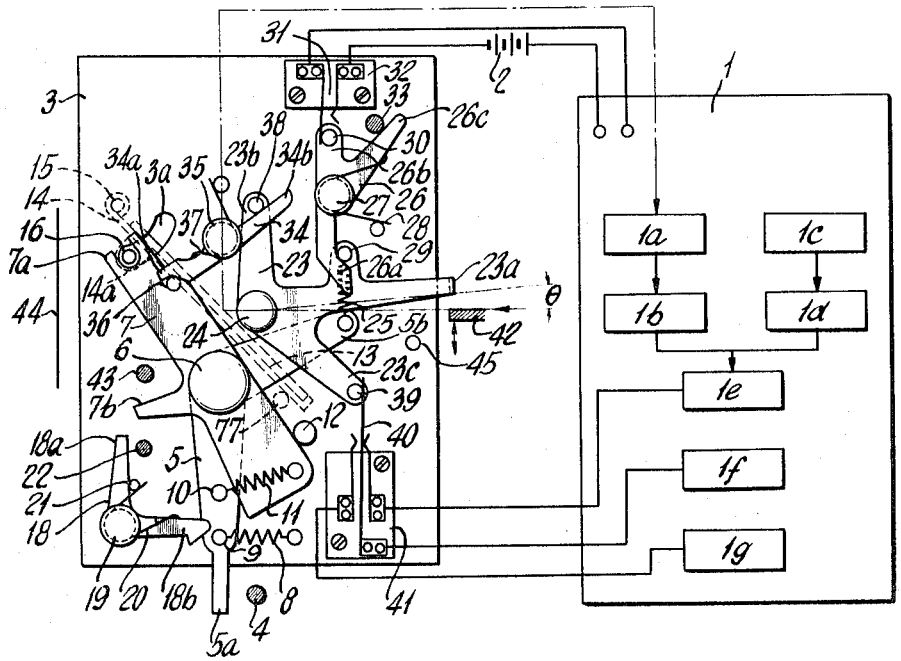
FIG. 1 is an elevational view and block diagram of a camera operation control mechanism embodying the present invention, the mechanism being illustrated following a photographing sequence.

Referring now to the drawings, and particularly FIGS. 1 to 4 thereof which illustrate a preferred embodiment of the present invention, the reference numeral 1 generally designates the camera shutter operational network which includes a light responsive section 1a containing a light receiving element and an equalizing circuit 1b connected thereto, a photographing condition section 1c and an equalizing circuit 1d connected thereto, a computing circuit 1e receiving and combining the outputs of the equalizing circuits 1b and 1d, a memory circuit 1f for temporarily memorizing the electric parameter corresponding to the object brightness computed by said computing circuit 1e, and a timing circuit 1g acting in accordance with the memorized value of said memory circuit 1f.

The operation circuit 1 is provided with a current source battery 2. The numeral 3 denotes a mirror box. A charge member 4 is horizontally reciprocable in driving connection with the camera shutter charge mechanism or film winding mechanism. A charge lever 5 of the well-known mirror quick-return mechanism and a mirror swing-up lever 7 are pivoted to the mirror box 3 by a shaft 6. The charge lever 5 and the mirror swing-up lever 7 are cooperatively connected together through a mirror swing-up spring 11 and a spring securing pin 10. The charge lever 5 is urged counterclockwise by a return spring 8 and is, under such spring urge, held at a predetermined position through the mirror swing-up lever 7 and a stop 12 secured to the mirror box 3. An arm 5a of the charge lever 5 is so positioned as to abut against charge member 4, while another arm 5b thereof is connected by a diaphragm spring 25 to a diaphragm lever 23 to be described later. One end of the mirror swing-up lever 7 is provided with a groove 7a. A mirror seat 14 is swingably supported by a shaft 15 and is provided with an ear portion 14a. A pin 16 secured to the ear portion 14a projects through a slot 3a and is engaged by groove 7a. The mirror seat 14 carries a mirror 13 fixed thereto and is held obliquely to the light path by a stop 17.

The arm 7b of lever 7 is so arranged as to abut a leading screen run initiating member 43 at the end of the swing-up movement of the mirror lever 7. A lock lever 18 is swingably pivoted to the mirror box 3 by a shaft 19, is urged clockwise by a spring 20, and is limited in its swing by a stop 21. One arm of the lock lever 18 terminates in a hooked portion 18b which releasably engages a pin 9 which serves also as a spring securing member and is fixed to the charge lever 5. The other arm 18a of the lock lever 18 is positioned in the path of movement of a release member 22 which is in driving connection with the shutter lagging screen and effects a reciprocating movement in the direction of the arrow at the end of the lagging screen run.

A three-armed diaphragm operating lever 23 is swingable on a pivot 24 and a spring securing pin 29 secured to a first arm 23a of the lever 23 is cooperatively connected with the arm 5b of the charge lever 5 by means of the diaphragm spring 25. In the movement path of the end portion of the arm 23a, there is positioned a diaphragm coupling member 42 of the automatic objective. Arrangement is so made that clockwise swing by an angle $\theta$ of the arm 23a as viewed in FIG. 1 will bring it into abutment against the coupling member 42. The lever arm 23b is provided with a pin 38 which is movable into abutment with a mirror retaining lever 34, to be described later, at the end of its swing movement. Another lever arm portion 23c is provided with an electrically insulating pin 39 which engages the change-over member of a switch 40 of the memory circuit 1f, which switch 40 is arranged on an insulating plate 41 secured to the outer wall of the mirror box 3.

A three-armed diaphragm action locking lever 26 is swingably pivoted to the mirror box 3 by a shaft 27 and is urged clockwise by a spring 28. The hooked portion 26a of one arm of the lever 26 is positioned to releasably engage a spring securing pin 29 secured to diaphragm operating lever 23. Another arm portion 26b of the lever 26 is provided with an electrically insulating pin 30 which engages the operating mmeber of a current source switch 31 arranged on an insulating plate 32 secured to the outer wall of the mirror box 3. Still another arm 26c of the lever 26 is positioned in the path of movement of a release member 33 which moves downwardly when the camera shutter buttom is depressed. A mirror action holding lever 34 is swingably pivoted to the mirror box 3 by a shaft 35 and is urged counterclockwise by a spring 37. One arm portion of holding lever 34 is formed into a hooked portion 34 a so as to the releasably engage a pin 36 secured to the mirror lever 7. The other arm portion 34b of the lever 34 projects, as mentioned before, into the engaging range of a pin 38 secured to the diaphragm operating lever 23 and abuts, when the clockwise movement of the diaphragm operation lever 23 is ended, against the pin 38 and then the mirror action holding lever 34 is swung clockwise. The numeral 44 denotes a film surface. A stop 45 is provided to control the maximum clockwise swing of the diaphragm operating lever 23.

Figure 5:
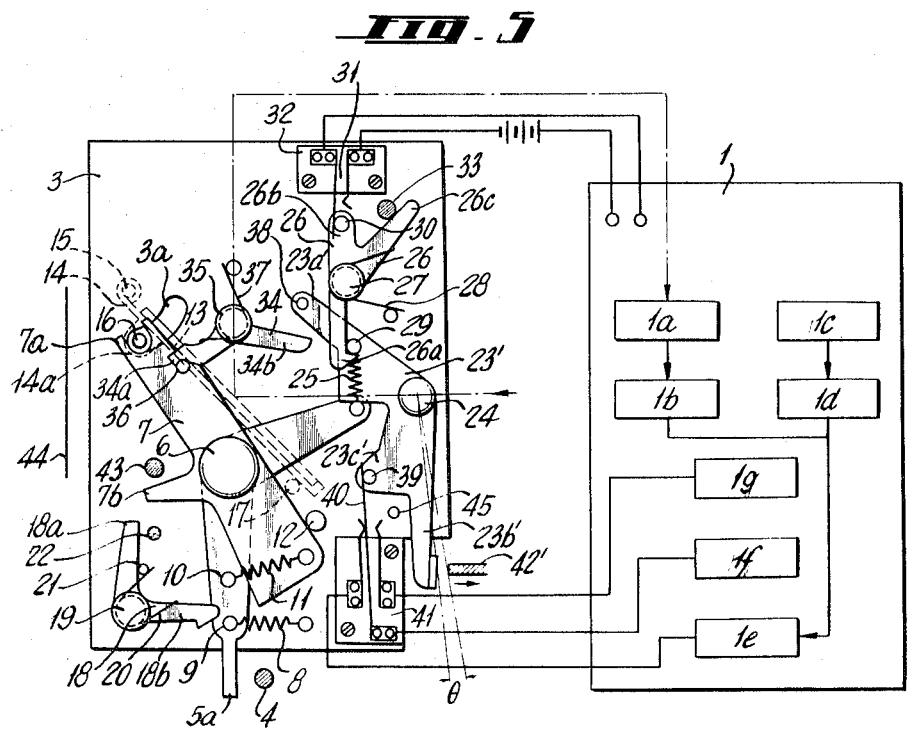
FIG. 5 is a view similar to FIG. 1 of another embodiment of the present invention.

In another example of the present invention as shown in FIG. 5, the diaphragm operating lever 23' (corresponding to the aforementioned diaphragm operating lever 23) is partially altered to be adapted to a push-pin diaphragm operation system according to which the diaphragm is stopped down due to movement in the direction of the optical axis of the diaphragm coupling member 42 of the objective. One arm portion 23a' of the diaphragm operating lever 23' is so positioned as to abut against the arm portion 34b of the mirror action holding lever 34; another arm portion 23b' of the lever 23' is positioned adjacent to the push-pin diaphragm coupling member 42', and still another arm portion 23c' positioned between the arm portions 23a' and 23b' is so arranged as to be adjacent to the switch 40 of the memory circuit 1f. In FIG. 5 and the foregoing FIGS. 1-4 members of the same functions are denoted by the same numerals respectively and the mechanisms are otherwise similar.

Figure 6:
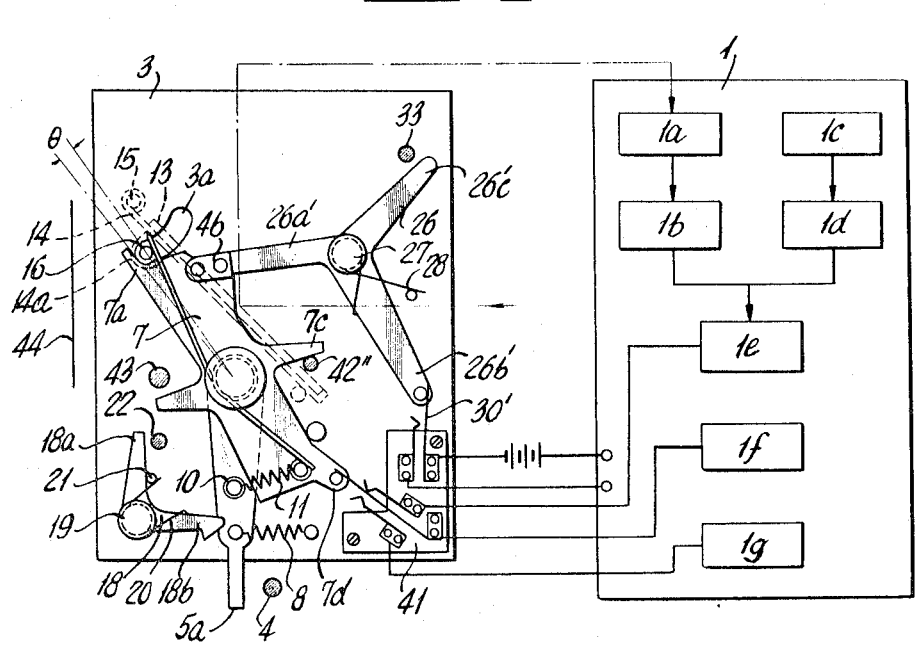
FIG. 6 is a view similar to FIG. 1 of still another embodiment of the present invention.

In still another example of the present invention as shown in FIG. 6, the objective diaphragm coupling member 42" is positioned in the movement path of the arm portion 7c of the mirror swing-up lever 7 so that the mirror swing-up lever 7 serves also as a diaphragm operating lever. Thus, in this example one lever is eliminated. An operating end portion 7d of the lever 7 is so arranged as to operate the switch 40 of the memory circuit 1f. One arm portion 26a' of a lever 26' which corresponds to the diaphragm action holding lever 26 of other examples is caused to directly engage an engaging member 46 of the lever 7, and a pin 30' secured to another arm portion 26b' of the lever 26' is so arranged as to operate the current source switch 31. In FIG. 6 and the foregoing FIGS. 1–5, members of the same functions are denoted by the same numerals respectively.

Figure 2:
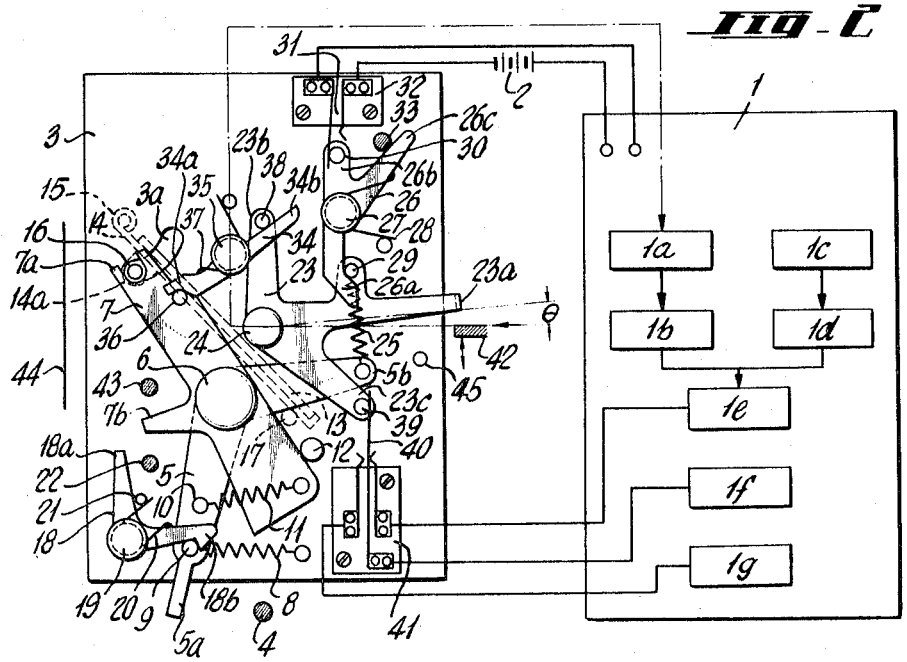
FIG. 2 is a view similar to FIG. 1 illustrating the mechanism in a cocked condition.

Considering now the operation of the camera illustratd in FIGS. 1 to 4, in the condition illustrated in FIG. 1 where one photographing operation has been completed, when the film winding operation is started for the next photographing operation, the charge member 4 moves to the left in driving connection with this operation and engages arm 5a and swings charge lever 5 clockwise against the action of the return spring 8. At this time, the engaging pin 36 of lever 7 is in engagement with the hooked portion 34a of the mirror holding lever 34 so that the lever 7 is prevented from swinging clockwise. As the charge lever 5 is swung, the spring 11 is tensioned and energy is stored for the mirror retraction operation. The pin 29 of the diaphragm operating lever 23 is in engagement with the hooked portion 26a of the diaphragm action holding lever 26 so that the diaphragm operating spring 25 between the pin 29 and the charge lever 5 is tensioned at the same time. As the swing movement proceeds, the pin 9 of the charge lever 5 engages the inclined surface of the lock lever 18 and causes it to swing counterclockwise against the spring urge until it passes over the inclined surface and engages the hooked portion 18a. The movement of the charge lever 5 ending with this engagement terminates the shutter charge operation. Then, when the charge member 4 returns, the return spring 8, the mirror retraction spring 11 and the diaphragm operating spring 25 remain in tensioned states (FIG. 2).

When the release member 33 is thereafter depressed it engages the arm 26c of the diaphragm action holding lever 26, and, sliding over it, causes the holding lever 26 to swing clockwise against the action of the spring 28. The first stage of this swing movement causes the insulating pin 30 to close the current source switch 31 so that the electronic shutter operation network 1 is energized; during this first stage the switch 40 remains in a condition connecting the memory circuit 1f to the computing circuit 1e. Accordingly, due to the object light passing through the camera objective, an electrically transformed amount, for example a resistance value, corresponding to the object brightness, is produced in the light responsive section 1a. The photographing conditions other than the object brightness, such as the set diaphragm value or the sensitivity value of the film used, are transformed into resistance values in the photographing condition section 1c comprising variable resistors, etc. These electrically transformed amounts are applied through the equalizing circuits 1b and 1d, respectively, to the computing circuit 1e, where an electrical amount corresponding to the proper exposure is computed. The information output resulting from this computation is stored as an electrical parameter in the memory circuit 1f through the switch 40.

Further depression of the release member 33 causes the hooked portion 26a of the diaphragm action holding lever 26 to be disengaged from the pin 29, so that the diaphragm operating lever 23 swings clockwise due to the action of the diaphragm spring 25. At this time, the hooked portion 26a of the diaphragm action holding lever 26 is in contact with the pin 29 of the diaphragm operating lever 23 over the whole movement range of the pin 29. Accordingly, after the hooked portion 26a is disengaged from the pin 29, the diaphragm action holding lever 26 is prevented by the pin 29 from making a returning movement under spring urge, so that the current source switch 31 remain closed.

The clockwise swing of the released diaphragm operating lever 23 causes the insulating pin 39 secured to the arm portion 23c to operate the switch 40 to disconnect the computing circuit 1e from the memory circuit 1f. Therefore, the memory circuit 1f memorizes the information fed to it from the computing circuit 1e up to this time, and then the switch 40 connects the memory circuit 1f to the timing circuit 1g. Thus, the electrical parameter stored in the memory circuit 1f is transferred to the timing circuit 1g.

Then, when the diaphragm operating lever 23 in the above indicated position swings by an angle $\theta$, the end of the arm portion 23a engages the diaphragm coupling member 42 (FIG. 3). Further clockwise swing of the diaphragm operating lever 23 causes the end of the arm 23a to depress the objective diaphragm coupling member 42 against its position restoring action so as to stop down the diaphragm to the predetermined preset value. This movement of the diaphragm operating lever 23 causes the pin 38 secured to arm 23b to act on the arm 34b of the mirror retraction holding lever 34 so as to cause the lever 34 to swing clockwise against the action of the spring 37. Accordingly, due to the action of the energized mirror retraction spring 11, the lever 7 rapidly swings clockwise until it abuts against the spring securing pin 10 of the charge lever 5 and is stopped. This movement of lever 7 causes, through the pin 16 engaging the groove 7a of another arm portion thereof, the mirror 13 to be retracted or swung up counterclockwise about the shaft 15 out of the light path. Thus, a photographing light path is established to the film surface 43 and the light path to the viewfinder system is blocked. At this time, however, the electrical parameter due to the transformation in the light responsive section 1a is stored in the memory circuit 1f. Therefore, the blocking of the incident light upon the light responsive section 1a has no influence upon the exposure time control operation (FIG. 4).

At the end of the swing movement of the lever 7, the arm 7c thereof acts upon the leading screen holding member 35 so as to release and cause the shutter leading screen to run. After the lapse of an exposure time corresponding to the photographing conditions such as the object brightness, etc., due to the operation of the timing circuit 1g to which the information stored in the memory circuit 1f is applied, the shutter lagging screen is released and caused to run and the photographing operation is completed.

At the end of the lagging screen run, the release member 22, which is in driving connection with the lagging screen, engages the arm 18a of the lock lever 18 and moves to the left, so that the lock lever 18 is swung counterclockwise against the action of the spring 20 and its hooked portion 18a is disengaged from the pin 9 of the charge lever 5. Thereupon, under the influence of the return spring 8, the charge lever 5 swings counterclockwise together with the mirror swing-up lever 7 until their movement is terminated through abutment against the stop 12. The release member 22 returns to its original position after completion of its action upon the lock lever 18.

Moreover, due to the return movement of the lever 7, the mirror 13, which has been withdrawn from the photographing light path, swings clockwise through the pin 16 engaging the groove 7a. Owing to the counterclockwise return movement of the arm 23a of lever 23, the diaphragm coupling member 42 returns through its position restoring action so that the diaphragm is fully opened. At the same time, the pin 29 of the arm 23a returns to the position where it engages the hooked portion 26a of the diaphragm action holding lever 26; arm 23b of the lever 23 causes the lever 34 to return to the original position; and upon return movement of the lever 7, the leading screen release member 43 returns to the position of FIG. 1 where it can prevent the leading screen from running. The arm 23c of the operating lever 23 causes, through the pin 39, the switch 40 to return to the original position; and the return movement of the diaphragm action holding lever 26 causes, through the pin 30 of the arm 26b, the current source switch 31 to be opened. Thus, the system is returned to the original state as shown in FIG. 1 and is ready to perform the next photographing operation.

The operation of the embodiment shown in FIG. 5 where the push-pin diaphragm operating system is introduced, is as follows:

As in the case with the first described embodiment, depression of the release member 33 after completion of the photographing preparatory operation causes the action holding lever 26 to be swung clockwise so that the current source switch 31 is closed and the diaphragm operating lever 23' is disengaged. Accordingly, the diaphragm operating lever 23' is swung counterclockwise under the action of the stored energy of the spring 25. The first stage of its swing (the swing angle θ) causes the switch 40 to change-over the memory circuit 1f from the computing circuit 1e to the timing circuit 1g, and further swing thereof causes the diaphragm coupling member 42' to be pushed out to the right. Further operation of this mechanism is the same as that first described, and then the photographing operation is completed and the entire system is returned to the original state.

The operation of the embodiment shown in FIG. 6 is as follows:

The depression of the release member 33 causes the lever 26' to be swung clockwise against the action of spring 28 so that the pin 30' of the lever 26' closes the current source switch 31 and the mirror swing-up lever 7 is disengaged from an arm 26a' of lever 26'. The first stage of the mirror swing-up action of the lever 7 (the swing angle θ) causes the operating end 7d thereof to operate the switch 40 so as to connect the memory circuit 1f to the timing circuit 1g, and then causes the arm portion 7c to push down the diaphragm coupling member 42''. Then, the mirror 13 is swung up. Further operation of this system is the same as in the foregoing embodiments, and then the photographing operation is complete and the entire system is returned to the original state.

In the foregoing description, the examples relate to a TTL system wherein the light responsive element received object light passing through the objective and reflected by a mirror placed obliquely in the light path. The present invention can also be applied to other types of TTL cameras wherein arrangement is so made that the light responsive element receives light passing through the mirror since in such cameras the same switch structure and operation can be adopted for the memory circuit change-over thereof. Further, the present invention can also be applied to general TTL type cameras receiving light passing through the camera objective, which cameras are not limited the single lens reflex cameras. In such TTL cameras which are not single lens reflex cameras, the light responsive element is withdrawn from the photographing light path before shutter opening due to the leading screen run, so that by establishing a first stage play movement range in the action of the driving member for withdrawal of the light responsive element from the light measuring position, the present invention can be applied to such TTL cameras.

Thus, according to the present invention, in an internally light receiving type camera having an electric shutter which contains a light responsive element for measuring object light passing through the objective and performs a control operation according to a memorized electrically transformed parameter, for example a resistance value, corresponding to the object brightness the switch change-over operation from the measuring circuit to the timing circuit is carried out through the first stage play movement range of the member for driving the diaphragm or the mirror upon release or of the driving member for the withdrawal of the light responsive element. Therefore, it is possible to accurately memorize the resistance value corresponding to the object brightness by the memory circuit, the abrupt change of the light incident upon the light responsive element due to the mirror movement or the withdrawal of the element has no influence upon the exposure time determination by the timing circuit and it is possible to memorize the object brightnes immediately before photographing operation. Accordingly, a full result of the internally light receiving type light measurement system is obtained for proper film exposure, thus providing numerous important advantages.

While there have been described and illustrated preferred embodiments of the present invention, it is apparent that numerous alterations, omissions and additions may be made without departing from the spirit thereof.

What is claimed is:

1. In a camera including an objective, a release member and an exposure mechanism movable between a charged and a discharged condition and actuated in response to said release member and including a shutter actuatable between open and closed conditions, a light measuring network including a photocell exposable to light traversing said objective, a memory network, a shutter timing network responsive to said memory network for controlling the interval between the opening and closing of said shutter, switching means actuatable between alternative first and second conditions coupling said memory network respectively to said light measuring network or said timing network, and means responsive to said exposure mechanism during the discharge thereof for actuating said switch to be in said second condition during the open interval of said shutter and returning said switch to said first condition upon the closing of said shutter.

2. The camera of claim 1 wherein said exposure mechanism includes control means for effecting at least one operation thereof, said switch actuating means including a means for successively actuating said switch to said second condition and said operation control means.

3. The camera of claim 2 wherein said exposure mechanism includes a mirror swingable between an advanced position obliquely across the path of the light traversing said objective and a retracted position and spring means urging said mirror toward said retracted position, said control means comprising means releasably locking said mirror in said advanced position.

4. The camera of claim 2 wherein said camera includes automatic preset diaphragm actuating means, said control means effecting the actuation of said diaphragm actuation means.

5. The camera of claim 2 wherein said control means includes means blocking the light traversing said objective and directed toward said photocell.

6. The camera of claim 2 wherein said camera includes a mirror swingable between an advanced position reflecting light traversing said objective to said photocell and a retracted position blocking said light to said photocell, and an automatic preset diaphragm actuating element, and said control means includes a first swingable lever coupled to said mirror and spring urged to an advanced position to retract said mirror and actuate said diaphragm actuating element, and means releasably locking said lever in a retracted position and movable toward a release position to first actuate said switch to said second condition and then release said lever.

7. The camera of claim 1 wherein said shutter includes leading and lagging shutter screens and said switch return means is responsive to the movement of said lagging shutter screen.

8. A camera having an electric shutter of internally light receiving type light measurement system wherein a light responsive element is contained for measuring the light passing through the objective, an electrically transformed amount corresponding to the object brightness sensed by the element is stored in the memory circuit through the measuring circuit, upon photographing operation exposure time control is carried out after change-over from the memory circuit to the timing circuit, characterized in that the memory circuit switch is returned to the original state in response to closing of the shutter action.

References Cited

UNITED STATES PATENTS

| | | | |
|---|---|---|---|
| 3,324,779 | 6/1967 | Nobusawa et al. | 95—10 C X |
| 3,442,190 | 5/1969 | Erickson | 95—10 C |
| 3,442,192 | 5/1969 | Sato | 95—42 |
| 3,485,154 | 11/1969 | Yamada | 95—10 C |

FOREIGN PATENTS

| | | | |
|---|---|---|---|
| 26682/68 | 3/1965 | Japan | 95—42 |

JOHN M. HORAN, Primary Examiner

T. A. MAURO, Assistant Examiner

U.S. Cl. X.R.

95—42